(No Model.)

J. G. PERRY.
NUT LOCK.

No. 482,907.   Patented Sept. 20, 1892.

Witnesses.
Charles Hannigan.
Howard B. Perry.

Inventor.
John G. Perry.

UNITED STATES PATENT OFFICE.

JOHN G. PERRY, OF WAKEFIELD, RHODE ISLAND.

NUT-LOCK.

SPECIFICATION forming part of Letters Patent No. 482,907, dated September 20, 1892.

Application filed February 13, 1892. Serial No. 421,379. (No model.)

*To all whom it may concern:*

Be it known that I, JOHN G. PERRY, of Wakefield, in the county of Washington, in the State of Rhode Island, have invented certain new and useful Improvements in Nut-Locks, of which the following is a specification, reference being had to the accompanying drawings, making part of the same.

This invention relates to a class of devices for preventing nuts on screw-bolts from becoming loose and working off, devices known as "nut-locks;" and this invention refers more especially to the nuts and bolts used to secure the fish-plates and the ends of railway-rails together, and is fully described in the following drawings, of which—

Figure 1:
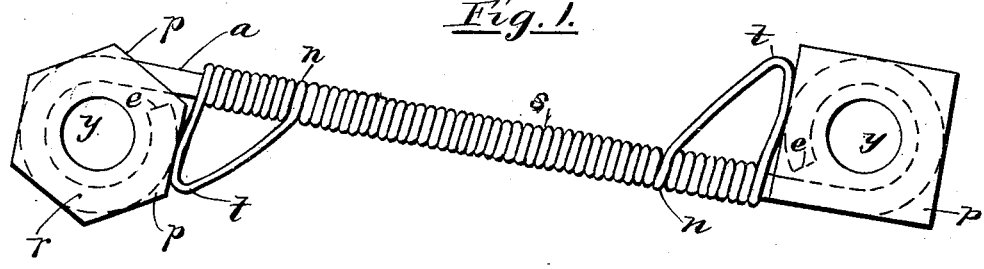
Figure 2:
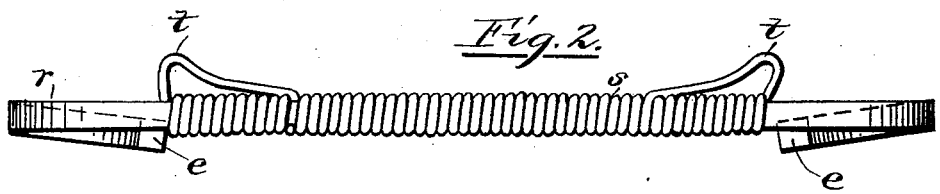
Figure 3:
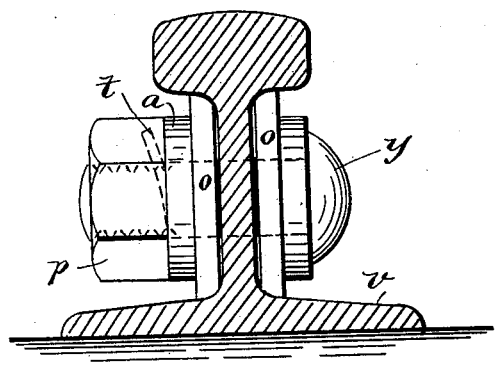

Figure 1 is a top view of the nut-lock with nuts in place. Fig. 2 is an edge view of the nut-lock. Fig. 3 is an end view of the nut-lock in position on the rails, the latter being shown in section.

The advantages desired to be attained by means of a nut-lock on a railway are not confined merely to preventing the nuts from becoming unscrewed from the bolt, but also include taking up any looseness produced by the wear of the parts caused by their rubbing together when trains pass over them or otherwise, and to combine a positive stop to prevent the nut from turning back and a spring sufficiently strong to hold the parts closely together. This last purpose is accomplished by means of a metallic bar $a$, bent back upon itself at each end to form two circles $r\ r$, the centers of which are the same distance apart as the centers of the holes made in the rails to receive the bolts by which the fish-plates are held. The ends $e$ of the bar $a$ in the circle are bent down below (see Fig. 3) to form short stiff spiral springs at each end. A wire $s$ is wound around the central portion of the bar $a$ between the two circular ends $r\ r$ and bent up to form a loop $t$ at each end near to the inner side of the circle formed on the end of the bar. These loops $t$ are bent up so as to bring their outer ends above the plane of the circles at the ends of the bar $a$. (See Fig. 2.) It is not necessary for the wire $s$ to cover the whole bar $a$ from one circle to the other, as that portion at each end between the two points $n\ n$ and the circles will be sufficient to hold the loops from turning, and to prevent them from being pushed away from the circles by the nuts one end of the wire $s$ may be bent over one side of the circle and pass down into or through it, so as to have a hold on the bar, or it may pass up around with the circle to surround the bolt with the circle, to prevent the coils from sliding on the bar $a$, or that portion may be covered with plate metal as an equivalent held in a similar way. In screwing the nuts $p$ onto the bolts $y$ the corners of the nut will ride up on the incline of the loops $t$ and depress it, so as to pass over; but the loop will immediately spring or be raised up again, so as to present a side to the corner or side of the nut, over which the nut will not pass back until the loop is pressed down, which is done when the nut is unscrewed.

In Fig. 3 the nut is represented as being screwed down on the nut-lock and fish-plate $o$, securing them to the rail $v$, the loop of the wire that holds the nut from turning being shown by the dotted lines $t$. The spiral circles of the bar $a$ form stiff springs that take up any looseness arising from the wear of the parts or otherwise.

Having thus described my improvements, I claim as my invention—

A nut-lock and bolt-tightener having a metallic bar with its ends bent around and down to encircle the bolts and form stiff spiral springs, with a wire wound around the bar between the circled ends and bent to form loops or tongues having their outer ends on the inner sides of the circles raised above the plane of the circles to prevent the nut from turning back, substantially as and for the purpose set forth.

JOHN G. PERRY.

Witnesses:
  H. B. PERRY,
  M. F. PERRY.